United States Patent
Na et al.

(10) Patent No.: US 12,179,867 B2
(45) Date of Patent: Dec. 31, 2024

(54) APPARATUS FOR PARKING A MOBILITY DEVICE

(71) Applicants: HYUNDAI MOTOR COMPANY, Seoul (KR); KIA CORPORATION, Seoul (KR)

(72) Inventors: Ho Kwon Na, Dangjin-si (KR); Yong Kyu Yoo, Yongin-si (KR); Jae Dong Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 93 days.

(21) Appl. No.: 18/095,214

(22) Filed: Jan. 10, 2023

(65) Prior Publication Data
US 2024/0076000 A1 Mar. 7, 2024

(30) Foreign Application Priority Data
Sep. 2, 2022 (KR) .................. 10-2022-0111300

(51) Int. Cl.
*B62H 3/02* (2006.01)
*F16B 2/06* (2006.01)
*F16B 2/16* (2006.01)

(52) U.S. Cl.
CPC .............. *B62H 3/02* (2013.01); *F16B 2/065* (2013.01); *F16B 2/16* (2013.01)

(58) Field of Classification Search
CPC ... B62H 3/02; B62H 3/00; B62H 3/10; B62H 5/06; B62H 5/02; B62H 5/04; B62H 2003/005; F16B 2/065; F16B 2/16
See application file for complete search history.

(56) References Cited

U.S. PATENT DOCUMENTS

| | | | | |
|---|---|---|---|---|
| 512,548 A | * | 4/1894 | Hurlbut | B62H 3/12 211/20 |
| 2,329,088 A | * | 9/1943 | Schram | B62H 3/00 211/17 |
| 3,841,119 A | * | 10/1974 | Kaufmann | B62H 3/02 D12/115 |
| 3,934,436 A | * | 1/1976 | Candlin | B62H 3/02 211/5 |
| 4,371,082 A | * | 2/1983 | Hostert | B62H 3/00 211/20 |
| 5,509,776 A | * | 4/1996 | Specht | B60R 9/042 224/924 |

(Continued)

FOREIGN PATENT DOCUMENTS

| | | | | |
|---|---|---|---|---|
| CH | 710161 A2 | * | 3/2016 | .............. A47F 7/00 |
| EP | 629544 A1 | * | 12/1994 | .............. B62H 3/10 |

(Continued)

*Primary Examiner* — Eret C McNichols
(74) *Attorney, Agent, or Firm* — Lempia Summerfield Katz LLC

(57) ABSTRACT

Provided is an apparatus for parking a mobility device to minimize road occupancy and safely park a mobility device. The apparatus includes: a clamp formed to be fastened to an installation object, while surrounding the installation object; a connection portion having one end connected to the clamp; and a holder rotatably connected to the other end of the connection portion through a first hinge and coupled to a portion of the mobility device.

11 Claims, 6 Drawing Sheets

(56) References Cited

U.S. PATENT DOCUMENTS

| | | | | |
|---|---|---|---|---|
| 5,516,020 A * | 5/1996 | Lawler | ............... | B60R 9/00 |
| | | | | 224/570 |
| 5,917,407 A * | 6/1999 | Squire | ............... | G07F 17/0057 |
| | | | | 235/382 |
| D488,106 S * | 4/2004 | Birkmann | ............... | D12/115 |
| 8,047,492 B2 * | 11/2011 | Wang | ............... | B62H 3/12 |
| | | | | 211/106.01 |
| 8,450,968 B2 * | 5/2013 | Navarro Ruiz | ............... | B62M 6/80 |
| | | | | 320/109 |
| 8,820,543 B2 * | 9/2014 | Huang | ............... | F16B 45/00 |
| | | | | 248/230.4 |
| 11,084,162 B1 * | 8/2021 | Liu | ............... | B25H 1/0014 |
| 11,142,133 B1 * | 10/2021 | Oshman | ............... | B60R 9/10 |
| 11,148,740 B2 * | 10/2021 | Greenblatt | ............... | B62H 5/003 |
| 11,161,561 B1 * | 11/2021 | Gu | ............... | B62H 3/12 |
| 11,400,989 B2 * | 8/2022 | Sørense | ............... | B62H 5/20 |
| 11,518,317 B2 * | 12/2022 | Oshman | ............... | B60R 9/06 |
| 11,612,997 B2 * | 3/2023 | Smith | ............... | B25H 1/0014 |
| | | | | 269/46 |
| 11,780,518 B1 * | 10/2023 | Ho | ............... | B62H 3/08 |
| | | | | 211/19 |
| 11,964,721 B1 * | 4/2024 | Liu | ............... | B62H 3/10 |
| 11,970,232 B2 * | 4/2024 | Wang | ............... | B60R 9/06 |
| 2005/0082329 A1 * | 4/2005 | Cohen | ............... | B60R 9/10 |
| | | | | 224/924 |
| 2008/0094192 A1 * | 4/2008 | Dutt | ............... | G07C 9/00896 |
| | | | | 340/427 |
| 2010/0089846 A1 * | 4/2010 | Navarro Ruiz | ............... | H02J 7/0042 |
| | | | | 320/109 |
| 2010/0228405 A1 * | 9/2010 | Morgal | ............... | B62H 3/00 |
| | | | | 701/1 |
| 2010/0237213 A1 * | 9/2010 | Wang | ............... | B62H 3/12 |
| | | | | 248/340 |
| 2015/0360739 A1 * | 12/2015 | Ashlag | ............... | B62H 3/02 |
| | | | | 211/5 |
| 2022/0001945 A1 * | 1/2022 | Greenblatt | ............... | B62H 5/003 |
| 2022/0153204 A1 * | 5/2022 | Oshman | ............... | B60R 9/10 |
| 2022/0185408 A1 * | 6/2022 | Askin | ............... | B62H 3/00 |
| 2022/0371468 A1 * | 11/2022 | Eliseev | ............... | B60L 53/66 |
| 2023/0415836 A1 * | 12/2023 | Cooney | ............... | B62H 3/02 |
| 2024/0067006 A1 * | 2/2024 | Na | ............... | B60L 53/126 |
| 2024/0067287 A1 * | 2/2024 | Shin | ............... | B62M 6/80 |
| 2024/0076000 A1 * | 3/2024 | Na | ............... | F16B 2/16 |
| 2024/0140547 A1 * | 5/2024 | Na | ............... | B62H 3/02 |

FOREIGN PATENT DOCUMENTS

| | | | | | |
|---|---|---|---|---|---|
| GB | | 2280653 A | * | 2/1995 | ......... B25H 1/0014 |
| GB | | 2310182 A | * | 8/1997 | ............ B62H 3/00 |
| KR | | 200484459 Y1 | | 9/2017 | |
| KR | | 102199566 B1 | | 1/2021 | |
| KR | | 20210074963 A | | 6/2021 | |
| KR | | 20210092599 A | | 7/2021 | |

* cited by examiner

APPARATUS FOR PARKING A MOBILITY DEVICE

CROSS-REFERENCE TO RELATED APPLICATIONS

This application claims benefit of and priority to Korean Patent Application No. 10-2022-0111300, filed on Sep. 2, 2022 in the Korean Intellectual Property Office, the disclosure of which is incorporated herein by reference in its entirety.

FIELD

The present disclosure relates to an apparatus for parking a mobility device to minimize road occupancy and to safely park a mobility device.

BACKGROUND

The statements in this section merely provide background information related to the present disclosure and may not constitute prior art.

In addition to health purposes, the use of micro mobility devices, such as electric kickboards, electric bicycles, electric scooters, etc., have rapidly increased due to traffic congestion and environmental pollution caused by an increase in vehicles.

Such mobility devices may cause almost no environmental pollution by operation thereof, and the mobility devices may efficiently use road space and thus increase individual mobility even when the road is congested. The mobility devices may be helpful to the health of users due to much less or little environmental pollution.

Mobility devices may be easily used in combination with shared services in addition to direct purchase. However, the mobility devices commonly used in this manner may satisfy the purpose of promoting convenience, but there may be no separate storage place or cradle, so they may be left unattended on the roadside or sidewalk after use.

Such unused or neglected mobility devices impair the aesthetics of a city, obstruct pedestrian passage, and cause pedestrian safety accidents and damage to mobility devices in severe cases. In addition, when mobility devices are left in front of a store, customers may be blocked from entering the store, resulting in an increase in civil complaints. To solve this problem, management personnel may be assigned but it is difficult to respond in real time.

SUMMARY

The present disclosure provides an apparatus for parking a mobility device that minimizes road occupancy and allows a mobility device to be safely parked.

According to an aspect of the present disclosure, an apparatus for parking a mobility device includes: a clamp formed to be fastened to an installation object, while surrounding the installation object; a connection portion having one end connected to the clamp; and a holder rotatably connected to the other end of the connection portion through a first hinge and coupled to a portion of the mobility device.

The holder may be rotatable about the first hinge in a height direction.

One end of the connection portion may be connected to the clamp through a second hinge.

The connection portion may be rotatable about the second hinge in a horizontal direction.

The second hinge may further include a bushing or a bearing.

According to an aspect of the present disclosure, an apparatus for parking a mobility device includes: a clamp formed to be fastened to an installation object, while surrounding the installation object; an arm member having one side connected to the clamp and extending to have a predetermined length; a plurality of connection portions having one ends connected to the other side of the arm member; and a plurality of holders rotatably connected to the other end of each connection portion via a first hinge and coupled to a portion of the mobility device.

The plurality of connection portions may be disposed to be spaced apart from each other at a distance.

The plurality of connection portions may be disposed to be inclined at a predetermined angle with respect to a longitudinal axial line of the arm member.

Each holder may be rotatable about the first hinge in a height direction.

One end of each connection portion may be connected to the arm member via a third hinge.

Each connection portion may be rotatable about the third hinge in a horizontal direction.

The third hinge may further include a bushing or a bearing.

The clamp may include: a first clamp body having a concave groove along an inner circumferential surface and having insertion holes formed in both end portions thereof; a second clamp body having a concave groove along an inner circumferential surface and having screw holes formed in both end portions thereof; and a fixing screw inserted into the insertion hole and screwed into the screw hole to provide fastening force to the first clamp body and the second clamp body.

The clamp may include: a first clamp body having a concave groove along an inner circumferential surface and having a pair of radially protruding protrusions formed at both end portions thereof; a second clamp body having a concave groove along an inner circumferential surface and having radially protruding hinge portions at both end portions; a hinge bolt having one end rotatably connected to the hinge portion; and a nut portion screwed to the hinge bolt and providing fastening force to the first clamp body and the second clamp body when the hinge bolt is positioned between the pair of protrusions.

The holder may have a U-shaped cross-sectional shape and include a seating recess formed along an inner circumferential surface thereof, and a pressing member may be installed on an inner circumferential surface of at least one of a pair of extensions extending in a straight line of the holder.

The pressing member may include: a body having an accommodating hole; a spring accommodated in the accommodating hole; and a ball member accommodated in the accommodating hole and elastically supported by the spring so that a portion thereof protrudes through an opening of the accommodating hole, wherein the ball member may be in contact with the mobility device.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Figure 1:
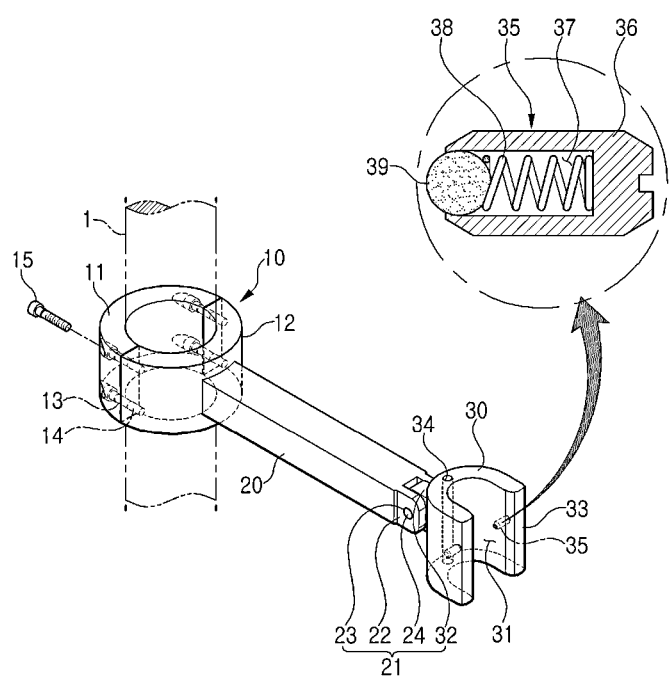
FIG. 1 is a perspective view illustrating an apparatus for parking a mobility device according to a first embodiment in the present disclosure.

Hereinafter, the present disclosure is described in detail with reference to the accompanying drawings. In adding reference numerals to the components of each drawing, it should be noted that the same components are given the same reference numerals as possible even if they are shown in different drawings.

In the present disclosure, a mobility device may include a micro-mobility device, such as an electric kickboards, an electric bicycle, and an electric scooter. However, the mobility device is not necessarily limited to electric mobility devices, and may be used as including manual mobility devices.

When a component, device, element, or the like of the present disclosure is described as having a purpose or performing an operation, function, or the like, the component, device, or element should be considered herein as being "configured to" meet that purpose or to perform that operation or function.

In the present disclosure and drawings, the present disclosure is described and illustrated by taking as an example a case in which a mobility device is a kickboard, but the application examples of the present disclosure are not necessarily limited thereto.

In addition, terms, such as first, second, and third may be used to describe various components, but these components are not limited in order, size, location, and importance by terms, such as first, second, and third, and are named only for the purpose of distinguishing one component from other components.

Figure 2:
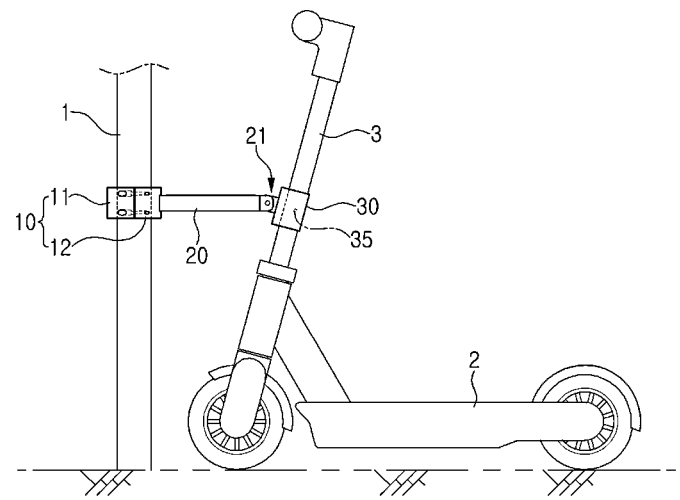
FIG. 2 is a diagram illustrating a state of use of the apparatus for parking a mobility device illustrated in FIG. 1.

FIG. 1 is a perspective view illustrating an apparatus for parking a mobility device according to a first embodiment in the present disclosure, and FIG. 2 is a diagram illustrating a use state of the apparatus for parking a mobility device illustrated in FIG. 1.

As illustrated in FIGS. 1 and 2, the apparatus for parking a mobility device may include a clamp 10, a connection portion 20, and a holder 30. These components may be formed of a rigid material, such as metal or plastic, for example.

The apparatus for parking a mobility device may be installed on, for example, a pillar member 1 itself or a pillar member constituting a certain structure on a road.

Here, the pillar member 1 may be a rod-shaped member or a tubular member, having a substantially circular, oval, or polygonal cross-section, such as an electric pole or street lamp, a post of a guard rail, etc., which are previously installed on the road.

However, an installation object is not limited to the pillar member 1 installed substantially upright. For example, the installation object may be a rod-shaped or tubular member in the form of a crossbeam and installed on the road.

The clamp 10 is a member formed to be fixedly fastened to the pillar member, while surrounding the pillar member 1 as an installation object. For example, the clamp may include a first clamp body 11 having a concave groove along an inner circumferential surface and having insertion holes 13 formed at both end portions thereof; a second clamp body 12 having a concave groove along an inner circumferential surface and having screw holes 14 formed at both end portions; and a fixing screw 15 inserted into the insertion hole and screwed into the screw hole to provide fastening force to the first clamp body and the second clamp body.

The concave groove of the first clamp body 11 and the concave groove of the second clamp body 12 may be combined to have a shape corresponding to an outer circumferential surface of the pillar member 1.

Here, the insertion hole 13 may be formed in the second clamp body 12, and the screw hole 14 may be formed in the first clamp body 11.

Figure 3:
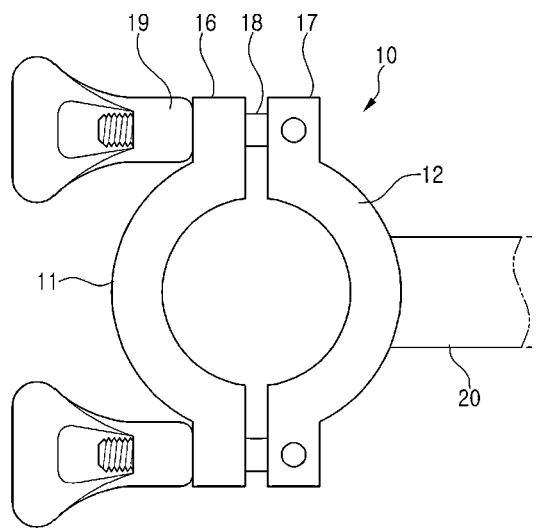
FIG. 3 is a plan view illustrating a modified example of a clamp.

Alternatively, in order to further improve convenience, as in the modified example illustrated in FIG. 3, the clamp 10 may include: a first clamp body 11 having a concave groove along an inner circumferential surface and including a pair of radially protruding protrusions 16 formed at both end portions; a second clamp body 12 having a concave groove along an inner circumferential surface and having radially protruding hinge portions 17 formed at both ends thereof; a hinge bolt 18 having one end rotatably connected to the hinge portion of the second clamp body; and a nut portion 19 screwed to the hinge bolt and providing fastening force to the first clamp body and the second clamp body when the hinge bolt is positioned between the pair of protrusions.

For example, a hinge hole (not illustrated) may be formed at one end of the hinge bolt 18 and may be pin-coupled to the hinge portion 17 of the second clamp body 12, so that the hinge bolt 18 may rotate in the hinge portion of the second clamp body based on one end thereof to be inserted between the pair of protrusions 16 on the first clamp body 11.

Here, the pair of protrusions 16 may be formed in the second clamp body 12, and the hinge portion 17 may be formed in the first clamp body 11.

These clamps 10 may be fastened to easily correspond to the pillar member 1 having a different thickness.

The first clamp body 11 and the second clamp body 12 may be formed to be symmetrical to each other. When the hinge bolt 18 is employed, the first clamp body 11 and the second clamp body 12 may be formed to be symmetrical to each other, except for the protrusion 16 and the hinge portion 17.

The concave grooves of the first clamp body 11 and the second clamp body 12 may be formed to have a substantially semicircular cross-sectional shape, and a portion of an outer circumferential surface of the pillar member 1 may be inserted thereinto and seated therein. However, the cross-sectional shape of the concave groove is not limited to the example described above and illustrated.

As illustrated in FIG. 1, in a state in which the first clamp body 11 and the second clamp body 12 face each other and surround the pillar member 1, the fixing screw 15 may be inserted into the insertion hole 13 of the first clamp body and the fixing screw may be screwed into the screw hole 14 of the second clamp body so as to couple the first clamp body and the second clamp body with the pillar member interposed therebetween. When the fixing screw is fastened, a washer, such as a flat washer or a spring washer, may also be interposed.

When the hinge bolt 18 is employed as illustrated in FIG. 3, in a state in which the first clamp body 11 and the second clamp body 12 face each other and surround the pillar member 1, the hinge bolt 18 hinged to the hinge portion 17 of the second clamp body may be rotated and moved between the pair of protrusions 16 at the end portion of the first clamp body, and then, the nut portion 19 screwed to the hinge bolt may be tightened to couple the first clamp body and the second clamp body with the pillar member interposed therebetween.

Accordingly, the clamp 10 may provide fastening force from both end portions of the clamp bodies 11 and 12, as a set of two, and mounted, while applying the same pressing force to the entire circumference of the pillar member 1, and the mounting position may be fixed and maintained.

The connection portion 20 is a member having a substantially bar shape, and one end thereof may be connected to the clamp 10 and the other end thereof may be connected to the holder 30. The connection portion may be formed to have a rectangular cross-sectional shape, but the cross-sectional shape is not limited to the example described above and illustrated. Further, the connection portion may be a tubular member.

Specifically, one end of the connection portion 20 may be fixedly connected to an outer circumferential surface of the second clamp body 12. For example, one end of the connection portion may be connected to the outer circumferential surface of the second clamp body by welding or the like, or the connection portion and the second clamp body may be integrally formed and connected.

The other end of the connection portion 20 may be connected to an outer circumferential surface of the holder via the first hinge 21. For example, a pair of hinge portions 22 having a hinge hole 23 may be formed at the other end of the connection portion and protrude in a longitudinal direction of the connection portion.

In another embodiment, the outer circumferential surface of the holder 30 may have a hinge coupling portion 32 formed to correspond to the hinge portion 22, and a hinge hole (not illustrated) may be formed in the hinge coupling portion.

The first hinge 21 may include a hinge pin 24 inserted into the hinge hole 23 of the hinge portion 22 and the hinge hole of the hinge coupling portion 32 such that the other end of the connection portion 20 is hinged to the holder 30.

The holder 30 may be a member having a substantially U-shaped cross-sectional shape, and may be rotatably connected to the other end of the connection portion 20 via the first hinge 21. This holder may be coupled to a portion of a mobility device 2, for example, a neck portion 3 of the mobility device, such as an electric kickboard, an electric bicycle, an electric scooter, and the like.

In one embodiment, the holder 30 may have a seating recess 31 formed along an inner circumferential surface and configured to define a cross-sectional shape thereof. The holder 30 may also have a hinge coupling portion 32 protruding from an outer circumferential surface and having a hinge hole. The hinge coupling portion 32 may be formed on one side of the outer circumferential surface.

As such, the holder 30 may rotate in a height direction via the first hinge 21. Thereby, the holder may be coupled to a portion of the mobility device 2, in other words, may match an inclination of the neck portion 3 to be coupled to the neck portion 3.

In addition, the holder 30 may include a pressing member 35 that may hold a portion of the mobility device with a predetermined coupling force.

For example, the pressing member 35 may be disposed on an inner circumferential surface of at least one of a pair of extensions 33 extending in a straight line from the holder 30. To this end, a mounting hole may be formed on an inner circumferential surface of the extension, and the pressing member may be inserted into the mounting hole to be installed.

The pressing member 35 may include: a body 36 inserted into the mounting hole and having an accommodating hole 37; a spring 38 accommodated in the accommodating hole; and a ball member accommodated in the accommodating hole and elastically supported by a spring so that a portion thereof protrudes through an opening of the accommodating hole.

Here, an opening of the accommodating hole 37 may have an inner diameter smaller than an outer diameter of the ball member 39. An edge of the body 36 forming the opening of the accommodating hole 37 is compressed after the ball member 39 is inserted into the accommodating hole 37. Accordingly, the ball member may be prevented from being separated from the accommodating hole of the body 36 through the opening of the accommodating hole.

The pressing member 35 may be disposed on each of the pair of extensions 33, and in this case, a portion of the mobility device 2 inserted into the seating recess 31 of the holder 30, in other words, the neck portion 3, may be elastically supported by the pressing members installed on both inner circumferential surfaces and facing each other, to be stably retained and supported in the holder.

In other words, due to the contact of the ball member 39 to which the elastic force of the spring 38 is applied, the neck portion 3 of the mobility device 2 may not be separated from the holder 30 and stay in the holder to be supported and fixed.

In this manner, since a portion of the mobility device 2 may be elastically inserted into the holder 30 to park the mobility device or may be elastically separated to use the mobility device, the convenience of parking and using the mobility device may be improved. Moreover, this may respond easily also to a mobility device in which a thickness of the neck portion 3 is different.

In another embodiment, the holder 30 may further include a through-hole 34 through which a lock wire (not illustrated) passes. For example, when the mobility device 2 is for personal use, the lock wire carried by a user may be passed through the through-hole of the holder and then connected to the corresponding mobility device to lock.

Since the apparatus for parking a mobility device according to the first exemplary embodiment in the present disclosure may use the pillar member 1 on the road, the device itself may minimize the occupancy in the road. Moreover, since the configuration is simple, there is an advantage of reducing the cost.

In addition, the apparatus for parking a mobility device according to the first exemplary embodiment in the present disclosure may simply hold the mobility device 2 to be parked and kept. Accordingly, it is possible to solve the problem of impairing the aesthetics of the city due to the indiscriminate neglect of mobility devices, and furthermore, it is possible to prevent obstruction of passage of pedestrians, safety accidents of pedestrians, and damage to mobility devices.

Figure 4:
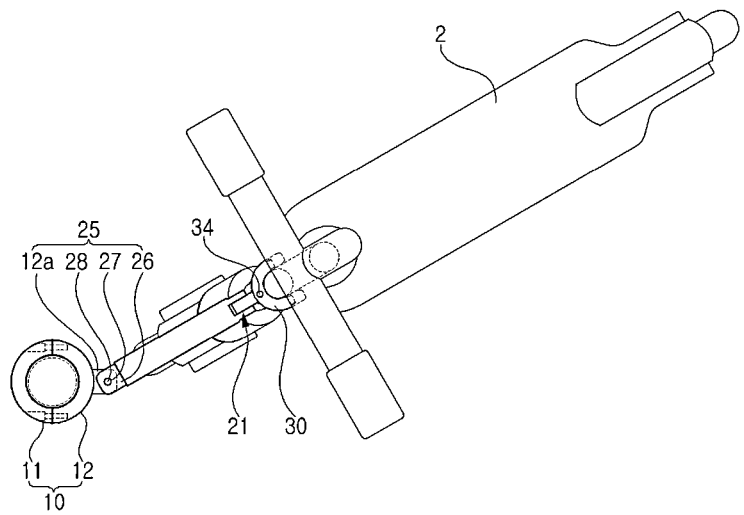
FIG. 4 is a plan view illustrating a use state of an apparatus for parking a mobility device according to a second embodiment in the present disclosure.

FIG. 4 is a plan view illustrating a use state of an apparatus for parking a mobility device according to a second exemplary embodiment in the present disclosure.

The second embodiment illustrated in FIG. 4 differs only in a connection relationship between the clamp 10 and the connection portion 20, and the other components are the same as those of the first exemplary embodiment. Accordingly, in describing the apparatus for parking a mobility device of the second exemplary embodiment, the same reference numerals are given to the same components as those of the apparatus for parking a mobility device according to the first exemplary embodiment described above, and detailed description of the configuration and function thereof has been omitted.

In the apparatus for parking a mobility device according to the second exemplary embodiment in the present disclosure, one end of the connection portion 20 may be connected to an outer circumferential surface of the second clamp body 12 constituting the clamp 10 via the second hinge 25.

For example, a pair of hinge portions 26 having a hinge hole 27 while protruding in a longitudinal direction of the connection portion may be formed at one end of the connection portion 20.

Meanwhile, a hinge coupling portion 12a formed to correspond to the hinge portion 26 may be provided on an outer circumferential surface of the second clamp body 12, and a hinge hole (not illustrated) may be formed in the hinge coupling portion.

The second hinge 25 may be constituted by inserting a hinge pin 28 into the hinge hole 27 of the hinge portion 26 and the hinge hole of the hinge coupling portion 12a, and accordingly, one end of the connection portion 20 and the second clamp body 12 of the clamp 10 may be hinged.

For smoother rotation of the second hinge 25, a bushing or a bearing (not illustrated) coupled to the hinge pin 28 may be additionally installed in the hinge portion 26 and/or the hinge coupling portion 12a.

Accordingly, in a state in which the clamp 10 is fixed to the pillar member 1, the connection portion 20 is rotatable about the second hinge 25 in a horizontal direction. Due to this, the mobility device 2 may be approached in various directions with respect to the pillar member to be mounted, and at the same time, a surrounding space around the pillar member in the road may be appropriately utilized as needed.

For example, when the mobility device 2 is not mounted, the connection portion 20 may be folded so as not to protrude, thereby minimizing the occupation of the road or at least not interfering with the passage of pedestrians.

When the mobility device 2 is mounted, the connection portion 20 may be rotated and unfolded horizontally with respect to the clamp 10, but an arrangement direction and the occupied space of the mobility device may be adjusted to be less obstructive to the passage of pedestrians.

Accordingly, the apparatus for parking a mobility device according to the second exemplary embodiment in the present disclosure may maximize the effect of preventing obstruction of passage of pedestrians, safety accidents of pedestrians, and damage to mobility devices.

Figure 5:
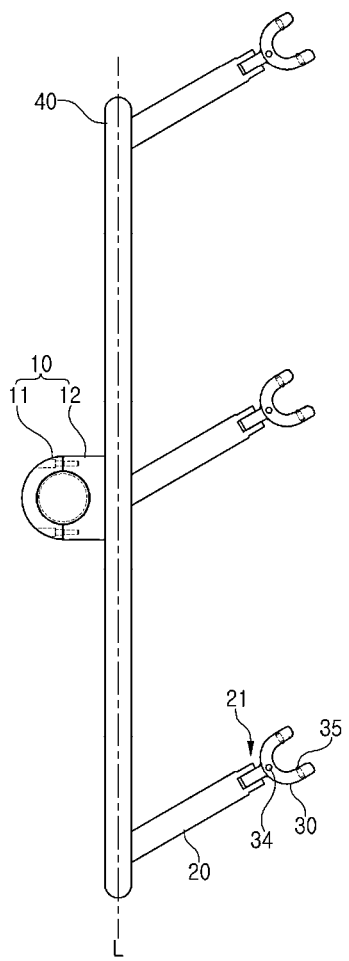
FIG. 5 is a plan view illustrating an apparatus for parking a mobility device according to a third embodiment in the present disclosure.
Figure 6:
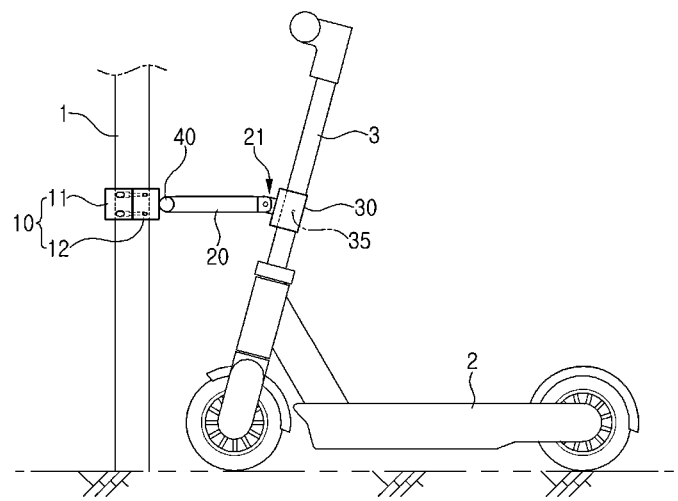
FIG. 6 is a diagram illustrating a state of use of the apparatus for parking a mobility device illustrated in FIG. 5.

FIG. 5 is a plan view illustrating an apparatus for parking a mobility device according to a third exemplary embodiment in the present disclosure, and FIG. 6 is a diagram illustrating a state of use of the apparatus for parking a mobility device illustrated in FIG. 5.

The third exemplary embodiment illustrated in FIGS. 5 and 6 is different from the first exemplary embodiment in that an arm member 40 is interposed between the clamp 10 and the connection portion 20, and in that a plurality of connection portions 20 and a plurality of holders 30 are provide, and the other components are the same as those of the first exemplary embodiment. Accordingly, in describing the apparatus for parking a mobility device of the third exemplary embodiment, the same reference numerals are given to the same components as those of the apparatus for parking a mobility device according to the first exemplary embodiment described above, and detailed description of the configuration and function thereof will be omitted.

As illustrated in FIGS. 5 and 6, the apparatus for parking a mobility device according to the third exemplary embodiment in the present disclosure may include the clamp 10, the arm member 40, the plurality of connection portions 20, and the plurality of holders 30. These components may be formed of a rigid material, such as metal or plastic, for example.

The arm member 40 is a substantially bar-shaped member extending to have a predetermined length, and one side thereof may be connected to the clamp 10, and the plurality of connection portions 20 may be connected to the other side thereof. The arm member may be formed to have a circular cross-sectional shape, but the cross-sectional shape is not limited to the example described above and illustrated. Further, the arm member may be a tubular member.

Specifically, one side of the arm member 40 may be fixedly connected to the outer circumferential surface of the second clamp body 12. For example, one side of the arm member may be connected to the outer circumferential surface of the second clamp body by welding or the like, or the arm member and the second clamp body may be integrally formed and connected.

The plurality of connection portions 20 may be fixedly connected to the other side surface of the arm member 40. For example, one end of each connection portion may be connected to the other side of the arm member by welding or the like, or the arm member and each connection portion may be integrally formed and connected.

On the other side of the arm member 40, the connection portions 20 may be spaced apart from each other at a predetermined distance and arranged side by side. In addition, the plurality of connection portions may be arranged to be inclined at a predetermined angle with respect to a longitudinal axis L of the arm member on the other side of the arm member.

In this case, the apparatus for parking a mobility device according to the third exemplary embodiment in the present disclosure may be installed so that the longitudinal axis L of the arm member 40 lies parallel to a proceeding direction of the road.

The other end of each connection portion 20 may be connected to the outer circumferential surface of the holder via the first hinge 21. The holder 30 may rotate in the height direction based on the first hinge 21.

The apparatus for parking a mobility device according to the third exemplary embodiment in the present disclosure may park a plurality of mobility devices 2 around a single pillar member 1 in the road, so that it has an effect of establishing a parking order, along with a construction of a parking infrastructure for mobility devices.

In addition, the apparatus for parking a mobility device according to the third exemplary embodiment in the present disclosure may conveniently mount a plurality of mobility devices to be parked and kept. Accordingly, it is possible to solve the problem of impairing the aesthetics of the city due to the indiscriminate neglect of mobility devices, and furthermore, it is possible to prevent obstruction of passage of pedestrians, safety accidents of pedestrians, and damage to mobility devices.

In particular, in the apparatus for parking a mobility device according to the third exemplary embodiment in the present disclosure, the plurality of mobility device 2 may be arranged in an oblique line with respect to the traveling direction of the road to be parked, so that the surrounding space of the pillar member 1 of the road may be more efficiently used and the passage of pedestrians may be less obstructed.

Figure 7:
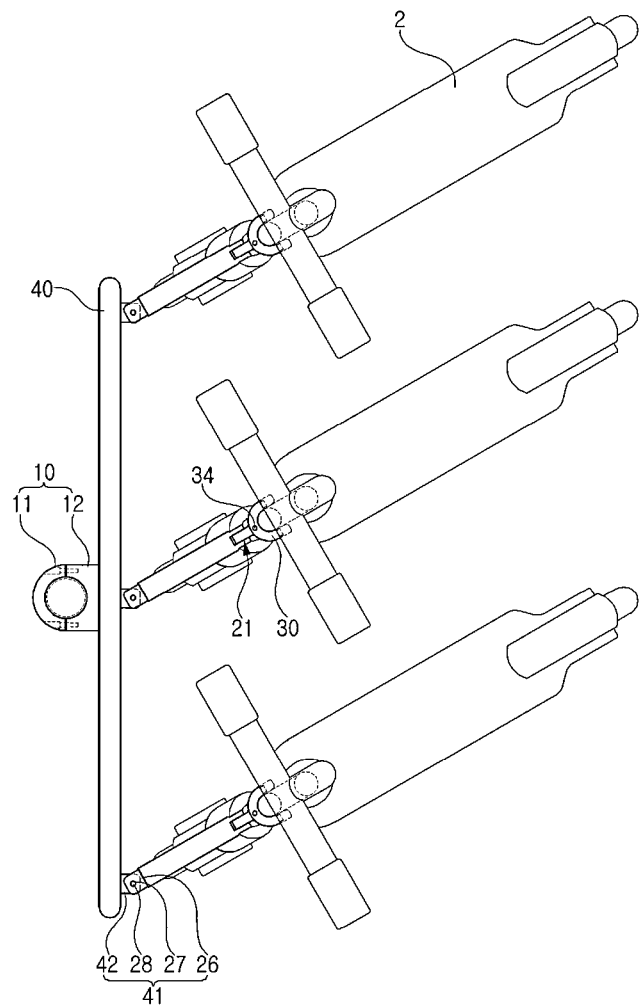
FIG. 7 is a plan view illustrating a use state of an apparatus for parking a mobility device according to a fourth embodiment in the present disclosure.

FIG. 7 is a plan view illustrating a use state of an apparatus for parking a mobility device according to a fourth exemplary embodiment in the present disclosure.

The fourth exemplary embodiment illustrated in FIG. 7 is different from the third exemplary embodiment only in the connection relationship between the arm member 40 and the connection portion 20, and the other components are the same as those of the third exemplary embodiment. Accordingly, in describing the apparatus for parking a mobility device of the fourth exemplary embodiment, the same reference numerals are given to the same components as those of the apparatus for parking a mobility device according to the third exemplary embodiment described above, and detailed description of the configuration and function will be omitted.

In the apparatus for parking a mobility device according to the fourth exemplary embodiment in the present disclosure, one end of each connection portion 20 may be connected to the other side of the arm member 40 via a third hinge 41.

For example, a pair of hinge portions 26 having a hinge hole 27 while protruding in the longitudinal direction of the connection portion may be formed at one end of each connection portion 20.

Meanwhile, on the other side of the arm member 40, a plurality of hinge coupling portions 42 formed to correspond to the hinge portions 26 may be provided, and a hinge hole (not illustrated) may be formed in each hinge coupling portion.

The third hinge 41 may be constituted by inserting the hinge pin 28 into the hinge hole 27 of the hinge portion 26 and the hinge hole of the hinge coupling portion 42, and thus one end of each connection portion 29 and the arm member 40 may be hinged.

For smoother rotation of the third hinge 41, a bushing or a bearing (not illustrated) coupled to the hinge pin 28 may be additionally installed in the hinge portion 26 and/or the hinge coupling portion 42.

Accordingly, in a state in which the clamp 10 is fixed to the pillar member 1, each connection portion 20 is rotatable in the horizontal direction based on the third hinge 41. Due to this, the mobility device 2 may be approached in various directions with respect to the pillar member to be mounted, and at the same time, a surrounding space around the pillar member in the road may be appropriately utilized as needed.

For example, when the mobility device 2 is not mounted, the corresponding connection portion 20 may be folded so as not to protrude, thereby minimizing the occupation of the road or at least not interfering with the passage of pedestrians.

When the mobility device 2 is mounted, the corresponding connection portion 20 may be rotated and unfolded horizontally with respect to the clamp 10, but an arrangement direction and the occupied space of the mobility device may be adjusted to be less obstructive to the passage of pedestrians.

Accordingly, the apparatus for parking a mobility device according to the fourth exemplary embodiment in the present disclosure may maximize the effect of preventing obstruction of passage of pedestrians, safety accidents of pedestrians, and damage to mobility devices, as well as constructing a parking infrastructure for a plurality of mobility devices.

According to an exemplary embodiment in the present disclosure, an effect of preventing deterioration of urban aesthetics due to neglect of public mobility devices may be obtained.

In addition, according to an exemplary embodiment in the present disclosure, since the structure on the road may be used, the device itself may minimize the occupancy of the road, and since a plurality of mobility devices may be parked, a parking order, as well as constructing a parking infrastructure for mobility devices, may be established.

While some embodiments have been illustrated and described above, it will be apparent to those having ordinary skill in the art that modifications and variations could be made without departing from the scope of the present disclosure.

What is claimed is:

1. An apparatus for parking a mobility device, the apparatus comprising:
   a clamp formed to be fastened to an installation object, while surrounding the installation object;
   an arm member having a first side connected to the clamp and extending to have a predetermined length;
   a plurality of connection portions each having a first end connected to a second side of the arm member; and
   a plurality of holders rotatably connected to a second end of each connection portion via a first hinge and coupled to a portion of the mobility device.

2. The apparatus of claim 1, wherein connection portions of the plurality of connection portions are disposed to be spaced apart from each other at a distance.

3. The apparatus of claim 2, wherein the connection portions are disposed to be inclined at a predetermined angle with respect to a longitudinal axial line of the arm member.

4. The apparatus of claim 1, wherein each holder is rotatable about the first hinge in a height direction.

5. The apparatus of claim 1, wherein one end of each connection portion is connected to the arm member via a third hinge.

6. The apparatus of claim 5, wherein each connection portion is rotatable about the third hinge in a horizontal direction.

7. The apparatus of claim 5, wherein the third hinge further includes a bushing or a bearing.

8. The apparatus of claim 1, wherein
   the clamp includes:
   a first clamp body having a concave groove along an inner circumferential surface and having insertion holes formed in both end portions thereof;
   a second clamp body having a concave groove along an inner circumferential surface and having screw holes formed in both end portions thereof; and
   a fixing screw inserted into the insertion holes and screwed into the screw holes to provide a fastening force to the first clamp body and the second clamp body.

9. The apparatus of claim 1, wherein
   the clamp includes:

a first clamp body having a concave groove along an inner circumferential surface and having a pair of radially protruding protrusions formed at both end portions thereof;

a second clamp body having a concave groove along an inner circumferential surface and having radially protruding hinge portions at both end portions;

a hinge bolt having one end rotatably connected to the hinge portion; and a nut portion screwed to the hinge bolt and providing a fastening force to the first clamp body and the second clamp body when the hinge bolt is positioned between the pair of radially protruding protrusions.

10. The apparatus of claim 1, wherein:

each holder of the plurality of holders has a U-shaped cross-sectional shape and includes a seating recess formed along an inner circumferential surface thereof, and a pressing member is installed on an inner circumferential surface of at least one of a pair of extensions extending in a straight line of a corresponding holder.

11. The apparatus of claim 10, wherein
the pressing member includes:
a body having an accommodating hole;
a spring accommodated in the accommodating hole; and
a ball member accommodated in the accommodating hole and elastically supported by the spring so that a portion thereof protrudes through an opening of the accommodating hole,
wherein the ball member is in contact with the mobility device.

* * * * *